(12) United States Patent
Ortiz et al.

(10) Patent No.: US 7,448,433 B2
(45) Date of Patent: Nov. 11, 2008

(54) RAPID PROTOTYPE CASTING

(75) Inventors: Milton Ortiz, Scottsdale, AZ (US);
Malak F. Malak, Tempe, AZ (US);
Steve H. Halfmann, Chandler, AZ (US)

(73) Assignee: Honeywell International Inc., Morristown, NJ (US)

(*) Notice: Subject to any disclaimer, the term of this patent is extended or adjusted under 35 U.S.C. 154(b) by 383 days.

(21) Appl. No.: 10/949,082

(22) Filed: Sep. 24, 2004

(65) Prior Publication Data

US 2006/0065383 A1    Mar. 30, 2006

(51) Int. Cl.
*B22C 9/00* (2006.01)
(52) U.S. Cl. .................. 164/516; 164/35; 164/361; 164/369
(58) Field of Classification Search .......... 164/516, 164/34, 35, 361, 369, 4.1
See application file for complete search history.

(56) References Cited

U.S. PATENT DOCUMENTS

| | | | | |
|---|---|---|---|---|
| 4,321,010 A | * | 3/1982 | Wilkinson et al. ........... 416/92 |
| 4,617,977 A | * | 10/1986 | Mills ........................... 164/30 |
| 5,594,652 A | | 1/1997 | Penn et al. |
| 5,824,250 A | * | 10/1998 | Whalen et al. .............. 264/219 |
| 6,152,211 A | | 11/2000 | Klug et al. |
| 6,193,922 B1 | | 2/2001 | Ederer |
| 6,242,163 B1 | | 6/2001 | Stampfl et al. |
| 6,255,000 B1 | * | 7/2001 | O'Connor et al. ........... 428/586 |
| 6,375,880 B1 | | 4/2002 | Cooper et al. |
| 6,491,891 B1 | | 12/2002 | Klett et al. |
| 6,571,484 B2 | * | 6/2003 | Hastilow ..................... 33/546 |
| 2004/0076519 A1 | | 4/2004 | Halfmann et al. |

* cited by examiner

Primary Examiner—Kevin P Kerns
(74) Attorney, Agent, or Firm—Ingrassia, Fisher & Lorenz, P.C.

(57) ABSTRACT

Methods for rapid prototype casting metal components, wherein the metal components are cast in a secondary ceramic mold, the secondary ceramic mold is cast in a primary mold, and the primary mold is formed by rapid prototyping or rapid manufacturing. The secondary ceramic mold may comprise a one-piece integral shell and core(s), and the metal components may have at least one hollow portion or void therein, such as a hollow airfoil for a gas turbine engine.

49 Claims, 4 Drawing Sheets

RAPID PROTOTYPE CASTING

BACKGROUND OF THE INVENTION

The present invention relates to methods for rapid prototyping metal components, and in particular to casting of hollow metal components in a secondary mold having an integral core and shell, the secondary mold being formed from a rapid prototyped primary mold.

Components having complex geometry, such as components having internal passages and voids therein, are difficult to cast using conventional methods; tooling for such parts is both expensive and time consuming, for example, requiring a lead-time of at least four months. This situation is exacerbated by the nature of conventional molds comprising a shell and one or more separately formed cores, wherein the core(s) are prone to shift during casting, leading to low casting tolerances and low casting efficiency (yield). Examples of components having complex geometry and which are difficult to cast using conventional methods, include hollow airfoils for gas turbine engines, and in particular relatively small, double-walled airfoils. Examples of such airfoils for gas turbine engines include rotor blades and stator vanes of both turbine, and compressor sections, or any parts that need internal cooling.

In prior art methods for casting hollow parts, a ceramic core and shell are produced separately: a ceramic core (for providing a hollow of the part) is assembled into a wax tool that will provide the external shape of the part, the core is encased in wax, a ceramic shell is formed around the wax pattern, and the wax is removed to form a ceramic mold in which a metal part may be cast. Such prior art methods are not only expensive and have long lead-times, but have the disadvantage of low casting yield, for example, due to lack of reliable registration between the core and shell allowing movement of the core relative to the shell during filling the mold with molten metal. In the case of hollow airfoils, another disadvantage of such prior art methods is that shaped film holes must be formed by an expensive, separate step after forming the cast part, for example, by electron discharge machining (EDM) or laser drilling.

Development time and cost for airfoils, such as turbine blades, are magnified because such components generally require several iterations, sometimes while the part is in production. To meet durability requirements, turbine blades are often designed with increased thickness and with increased cooling airflow capability in an attempt to compensate for poor casting tolerance, resulting in decreased engine efficiency and lower engine thrust. Improved methods for casting turbine blades will enable propulsion systems with greater range and greater durability, while providing improved airfoil cooling efficiency and greater dimensional stability.

U.S. Pat. No. 6,375,880 to Cooper et al. discloses a method for making molded parts employing shape deposition manufacturing of a layered structure having support segments and mold segments. After removal of the support segments, part material is cast in the mold, and the mold is removed to provide a molded part.

U.S. Pat. No. 6,152,211 to Klug et al. discloses forming a green product and a fired ceramic article by pouring or injecting a ceramic slurry into a die. The ceramic article may be used as a shell mold or core for investment casting of eutectic and superalloy materials. Neither Cooper et al. nor Klug et al. disclose a method for rapid prototyping metal components.

As can be seen, there is a need for methods that allow the rapid prototyping and accurate casting of metal components having complex geometry, such as hollow airfoils for turbomachinery.

SUMMARY OF THE INVENTION

According to one aspect of the present invention, there is provided a method for forming a metal component comprising forming a primary mold by a rapid prototyping process; forming a secondary mold from the primary mold by casting secondary mold material in the primary mold, wherein the secondary mold material comprises a ceramic; and casting the metal component in the secondary mold.

According to another aspect of the present invention, there is provided a method for casting a metal component comprising forming a one-piece primary mold via a rapid prototyping process, wherein the primary mold includes a primary shell and a primary core integral with the primary shell; forming a secondary mold from the primary mold, wherein the secondary mold includes a secondary shell and a secondary core integral with the secondary shell, and the secondary mold comprises a ceramic; and casting the metal component in the secondary mold, wherein the metal component includes at least one component internal void, and the secondary core defines the at least one component internal void.

According to still a further aspect of the present invention, there is provided a method for rapid prototyping a hollow metal airfoil comprising forming a one-piece primary mold via a rapid prototyping process, wherein the primary mold includes a primary shell and an integral primary core; gelcasting a secondary mold from the primary mold, wherein the secondary mold includes a secondary shell, a secondary core integral with the secondary shell, and a plurality of secondary registration portions for registering the secondary shell with the secondary core, and wherein the secondary mold comprises a ceramic; and casting the metal airfoil in the secondary mold, wherein the metal airfoil includes an external surface having a plurality of film cooling holes therein, and at least one component internal void in communication with the film cooling holes, wherein the film cooling holes are formed by casting the metal airfoil in the secondary mold.

According to yet another aspect of the present invention, a method for forming a secondary mold comprises forming a one-piece primary mold by a rapid prototyping process, the primary mold having a primary core, a primary shell integral with the primary core, and a primary outer void disposed between the primary shell and the primary core; and gelcasting the secondary mold in the primary mold, the secondary mold having a secondary core, a secondary shell integral with the secondary core, and at least one secondary registration portion for registering the secondary shell with the secondary core, wherein the primary outer void defines the secondary shell.

These and other features, aspects, and advantages of the present invention will become better understood with reference to the following drawings, description, and claims.

DETAILED DESCRIPTION OF THE INVENTION

Figures 1A, 1B:
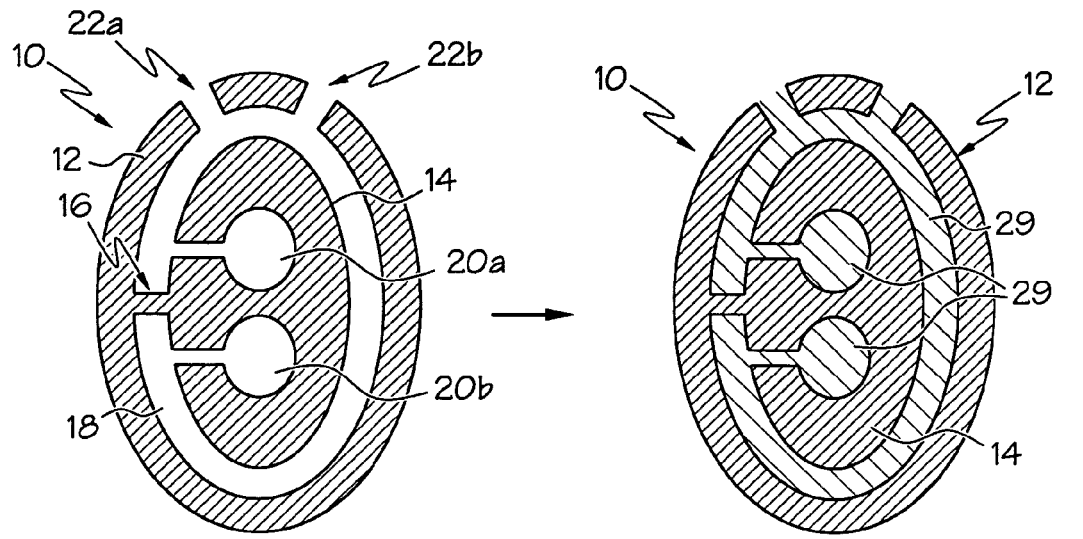
FIGS. 1A-E schematically represent stages in forming a metal component involving a rapid prototyping process, according to one embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides metal components and methods for making such components. The present invention may be used to provide metal components having complex geometry and one or more internal voids therein. The present invention may incorporate a rapid prototyping process to decrease time between iterations in designing metal components having complex geometry, and to shorten production lead-time of the metal components. As a non-limiting example, the present invention may be used to form metal rotor blades and stator vanes for a gas turbine engine. Such blades and vanes may be hollow, may be single- or double-walled, and may have a plurality of internal voids, including cooling channels. It is to be understood however, that the present invention is not limited to rotor blades and stator vanes of gas turbine engines, nor to components for turbomachinery.

In contrast to the prior art, the present invention allows rapid prototyping of a complex metal component, wherein the metal component may be cast in a secondary mold, the secondary mold may be formed in a primary mold, and the primary mold may be formed by a rapid prototyping process. The present invention also provides a method for casting a metal component, having at least one internal void therein, from a one-piece mold having an integral shell and core. This is in contrast to the prior art where a separate core may be formed for each internal void of a part to be cast. In further contrast to the prior art, the present invention provides a process for prototyping or manufacturing hollow metal components of complex geometry, such as a hollow airfoil having a plurality of internal voids and a plurality of film cooling holes, wherein the internal voids and the film cooling holes are formed in a single step by casting the airfoil in a one-piece mold.

FIGS. 1A-E are sectional views schematically representing stages in forming a metal component 50 (FIG. 1E) involving a rapid prototyping (RP) process, according to one embodiment of the invention. For purposes of clarity of illustration, the metal component 50 is shown as being ovoid and having first and second component internal voids 52a, 52b. The invention is by no means limited to forming components of a particular shape or geometry. The present invention may be particularly suited to forming hollow components having relatively complex geometry, and relatively small size. Prior art methods that rely on separately forming a plurality of small cores, followed by assembling the individual cores and a shell to form a prior art mold, have a number of inherent problems, including poor registration between cores and shell, and low casting yield.

FIG. 1A is a sectional view of primary mold 10, according to one aspect of the invention. The geometry of both primary mold 10 and a secondary mold 30 (FIG. 1C) may be dependent on the intended geometry of metal component 50. Primary mold 10 may be conveniently, accurately, and rapidly prepared by a rapid prototyping process. Rapid prototyping processes, in which objects are manufactured by sequential deposition of a plurality of layers of one or more materials based on Computer-Aided Design (CAD) data, are generally known in the art. Briefly, rapid prototyping of an object, such as primary mold 10, may be performed as follows: 1) a CAD model of primary mold 10 or other object may be created; 2) the CAD model may be converted to STL (stereolithography) format; 3) the STL file may be prepared by a pre-processing program to adjust the size and orientation (x, y and z planes) of primary mold 10; and 4) primary mold 10 may be constructed by deposition of sequential layers of primary mold material. Step 4) may be performed by various RP deposition techniques known in the art of rapid prototyping, such as ink-jet printing or micro-droplet fabrication. Optionally, after step 4), primary mold 10 may be finished or cleaned.

Figure 1C:
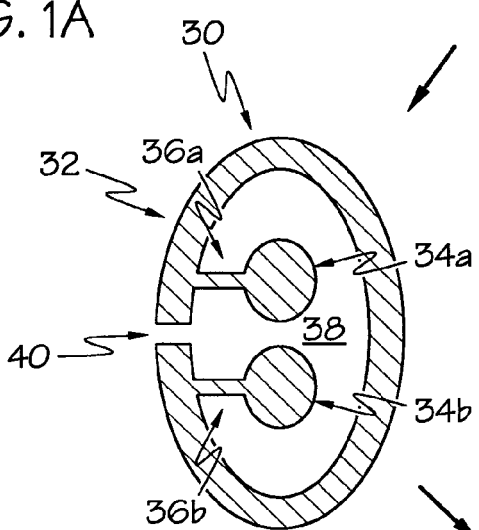

Primary mold 10 may be a one-piece mold comprising a primary shell 12 and a primary core 14 integral primary shell 12. Primary mold 10 may further comprise a primary outer void 18 disposed between primary core 14 and primary shell 12. Primary mold 10 may still further comprise at least one primary registration portion 16 for registering primary core 14 with primary shell 12. Primary registration portion 16 may provide and maintain correct spatial alignment of primary core 14 with primary shell 12, e.g., during formation of secondary mold 30 (see FIGS. 1B-C). Primary registration portion 16 may define a secondary mold hole 40 of secondary mold 30 (FIG. 1C). Primary mold 10 may still further comprise first and second primary inner voids 20a, 20b, wherein first and second primary inner voids 20a, 20b may be disposed within primary core 14. It is to be understood that the present invention is not limited to forming a primary mold 10 having two inner voids, but rather in some embodiments fewer inner voids, or a much larger number of inner voids, may be formed.

In some embodiments, primary mold 10 may be formed by a RP process in which a plurality of layers of primary mold material and of support material are sequentially deposited based on CAD data, wherein the primary mold material may comprise, for example, a wax or a thermoplastic. Thereafter, the support material may be selectively removed, for example, by melting or dissolution of the support material to form primary outer void 18 as well as first and second primary inner voids 20a, 20b. The support material may comprise, for example, a wax or a thermoplastic. In other embodiments, primary mold 10 may be formed by a RP process in which a plurality of layers of primary mold material are sequentially deposited, and wherein primary outer void 18, first primary inner void 20a, and second primary inner void 20b are formed directly, by omitting deposition of mold material in a defined 3-dimensional space, without the use of support material.

FIG. 1B is a sectional view of primary mold 10 containing secondary mold material 29. Secondary mold material 29 may fill primary outer void 18, first primary inner void 20a, and second primary inner void 20b (FIG. 1A). Secondary mold material 29 may comprise a ceramic. Primary mold 10 may be filled with secondary mold material 29 via first primary mold hole 22a and/or second primary mold hole 22b.

FIG. 1C is a sectional view of secondary mold 30, according to one aspect of the invention. With reference to FIGS. 1B-C, secondary mold 30 may be formed by a gelcasting process. Gelcasting processes are generally well known in the art. Briefly, gelcasting secondary mold 30 in primary mold 10 may proceed as follows: 1) a slurry may be formed by mixing a ceramic powder (e.g., silica, alumina) with water or other solvent and an incipient binder (polymerizable monomer), and the mixture milled; 2) the slurry may be de-aired under a partial vacuum; 3) a polymerization initiator may be added to the slurry to initiate both polymerization of the incipient binder monomer and concomitant gel formation; 4) secondary mold 30 may be cast by filling primary mold 10 with the slurry; 5) the binder in the slurry may then be polymerized, e.g., in an oven, to immobilize particles of the ceramic powder in the shape defined by primary mold 10; 6) after removal of primary mold 10, which may typically be performed using various solvents, the cast ceramic part or green body (i.e., incipient secondary mold 30) may be dried to remove most of the water or other solvent; and 7) the ceramic part may be fired at high temperatures (e.g., at 550° C. to 1800° C. in a furnace) to burn out organic polymer and to sinter the ceramic part to form secondary mold 30. Optionally, the ceramic part may be machined, e.g., prior to firing the ceramic part is relatively soft.

Again with reference to FIG. 1C, secondary mold 30 may be a one-piece mold comprising a secondary shell 32 and a secondary void 38 within secondary shell 32. Secondary mold 30 may further comprise first and second secondary cores 34a, 34b disposed within secondary void 38. Secondary mold 30 may still further comprise a first secondary registration portion 36a disposed between first secondary core 34a and secondary shell 32, and a second secondary registration portion 36b disposed between second secondary core 34b and secondary shell 32. First and second secondary registration portions 36a, 36b may provide registration, or correct alignment, of first and second secondary cores 34a, 34b with secondary shell 32, for example, during casting metal component 50 in secondary mold 30 (see, for example, FIGS. 1D-E). Additional registration portions (not shown) may provide registration of first secondary core 34a with second secondary core 34b.

Figure 1D:
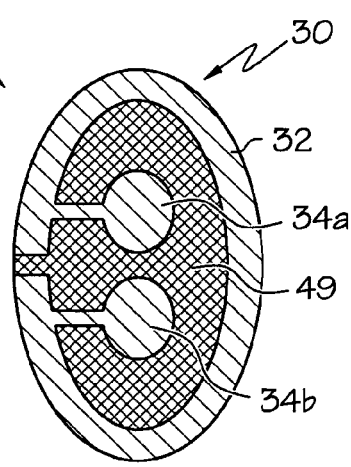
Figure 1E:
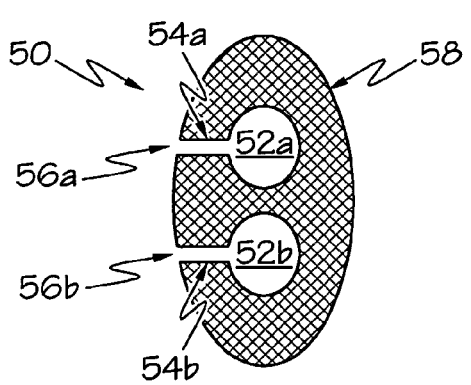

With reference to FIGS. 1D-E, FIG. 1D is a sectional view of secondary mold 30 containing metal component material 49. As an example, metal component material 49 may comprise a metal, for example, an alloy such as a titanium-based alloy, or a nickel- or cobalt-based superalloy. Metal component material 49 may be poured in a molten state into secondary mold 30 so as to fill secondary void 38, wherein first and second secondary cores 34a, 34b may define first and second component internal voids 52a, 52b of metal component 50 (FIG. 1E). The presence of first and second secondary registration portions 36a, 36b may prevent or eliminate shifting of first and second secondary cores 34a, 34b during casting of metal component 50. As a result, tighter tolerances in the dimensions of the cast metal component 50 may be attained.

Secondary mold 30 may be filled with metal component material 49 via secondary mold hole 40. Secondary mold 30 may include more than one secondary mold hole 40, only one of which is shown. Metal component material 49 may be allowed to solidify within secondary mold 30 to form metal component 50. Metal component 50 may be cast by single crystal casting, directionally solidified casting, or equiaxial casting. Secondary mold 30 may be removed from metal component 50 by conventional methods, for example, secondary shell 32 may be removed by a jet of water, and first and second secondary cores 34a, 34b may be removed by an acid. First and second secondary registration portions 36a, 36b may be similarly removed from metal component 50 to form first and second channels 54a, 54b within metal component 50.

With reference to FIG. 1E, metal component 50 may include an external surface 58 having first and second holes 56a, 56b therein. First and second holes 56a, 56b in external surface 58 may allow fluid communication between first and second component internal voids 52a, 52b and external surface 58 via first and second channels 54a, 54b. First and second secondary registration portions 36a, 36b of secondary core 30 may define first and second channels 54a, 54b, together with first and second holes 56a, 56b, of metal component 50. The cross-sectional shape of first and second channels 54a, 54b, and correspondingly the cross-sectional shape of first and second secondary registration portions 36a, 36b, may be cylindrical or variously shaped.

Figure 2:
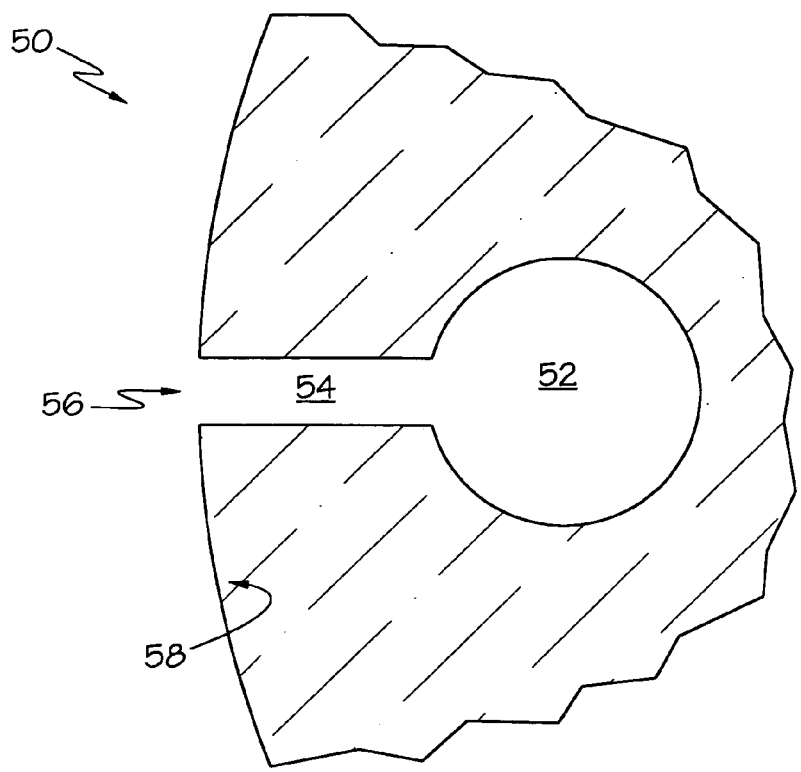
FIG. 2 is an enlarged view of a portion of a metal component, having an internal void therein, prepared according to one aspect of the invention.

FIG. 2 is an enlarged cross-sectional view of a portion of a metal component 50 having an internal void 52 therein, according to one aspect of the invention. Internal void 52 may be in communication with the exterior of metal component 50 via channel 54, which may extend from internal void 52 to hole 56 in external surface 58 of metal component 50. According to the present invention, holes 56, voids 52, and channels 54 may all be formed simultaneously and integrally with metal component 50 in a single step by casting metal component 50 in secondary mold 30 (see, for example, FIGS. 1D-E and FIG. 5).

Internal void 52, as shown in FIG. 2, may have a generally rounded shape. However, it is to be understood that other numbers, arrangements, and geometries of holes 56, voids 52, and channels 54 are also contemplated under the invention. As an example only, a hollow airfoil (see, for example, FIGS. 4A-B) having a plurality of internal voids in fluid communication with a plurality of film cooling holes may be provided under the present invention, for example, according to processes described herein with reference to FIGS. 1A-E and FIG. 5.

Figure 3A:
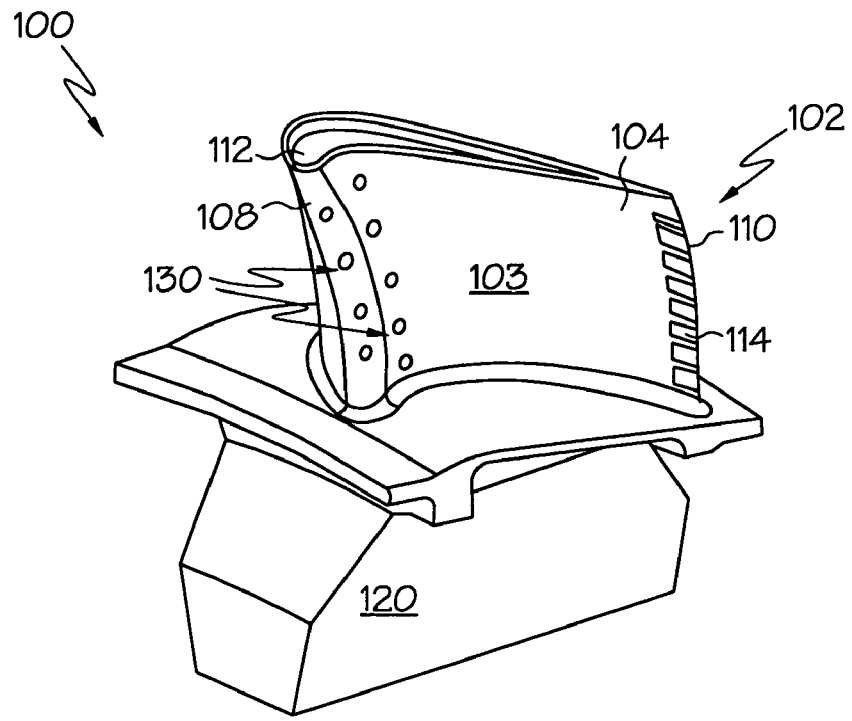
FIG. 3A is a perspective view of a pressure side of an airfoil prepared according to one embodiment of the invention.
Figure 3B:
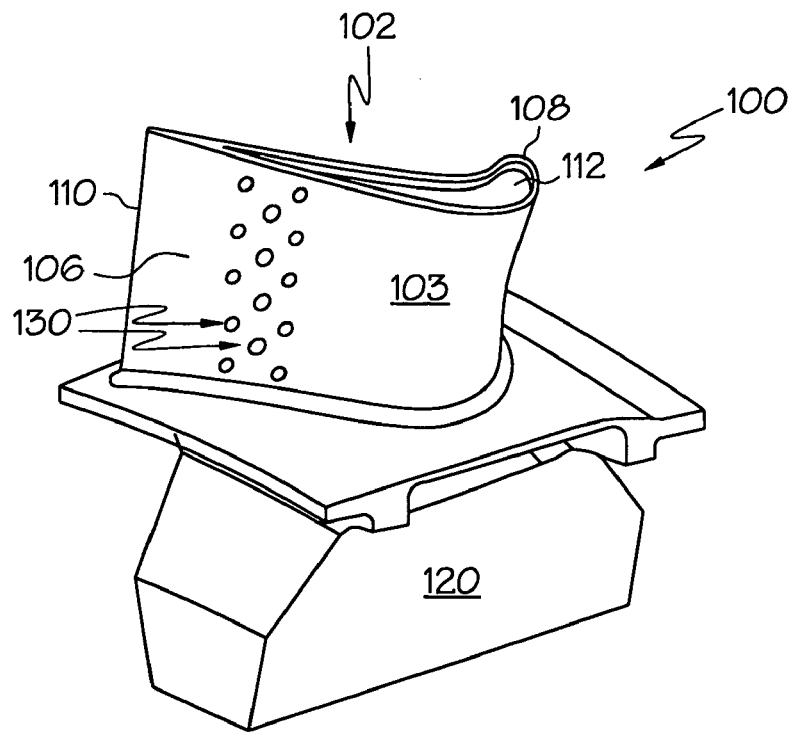
FIG. 3B is a perspective view of a suction side of the airfoil of FIG. 3A.

FIG. 3A is a perspective view showing a pressure side of an airfoil 100, and FIG. 3B is a perspective view showing a suction side of airfoil 100, wherein airfoil 100 may be prepared according to the present invention. Airfoil 100 may be a hollow airfoil for a gas turbine engine (not shown). As an example, airfoil 100 may be a turbine blade or vane, or a compressor blade or vane, for a gas turbine engine. Airfoil 100 may comprise an airfoil portion 102 and a root portion 120.

With reference to FIGS. 3A-B, airfoil portion 102 may include an airfoil wall 103, a concave side 104, a convex side 106, a leading edge 108, a trailing edge 110, and a blade tip 112. Airfoil portion 102 may further include a plurality of discharge slots 114 for discharging cooling air from airfoil 100 at trailing edge 110. Airfoil 100 may have a plurality of film cooling holes 130 and a plurality of voids therein (see, for example, FIGS. 4A-B) for cooling of airfoil 100 by promoting airflow therethrough (see, for example, commonly assigned, co-pending U.S. Published Patent Application No. 20040076519 A1, entitled *High Effectiveness Turbine Vane or Blade*). Airfoil 100 may be formed in its entirety in a single step, for example, step 306 of method 300 (FIG. 5), by casting airfoil 100 in a ceramic secondary mold 30 prepared according to a process described with reference to FIGS. 1A-C. It is to be understood, that the invention is by no means limited to the configuration of film cooling holes 130 shown in FIGS. 3A-B.

Figure 4A:
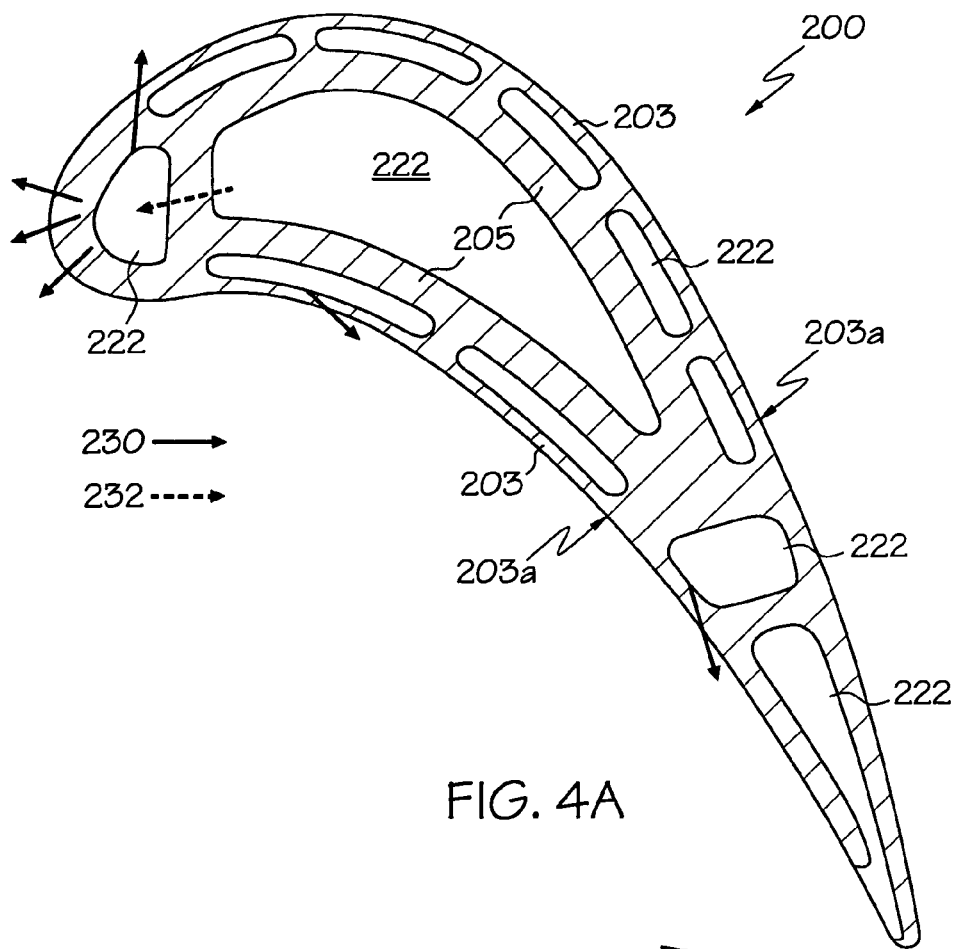
FIG. 4A is a sectional view of a double-walled hollow airfoil prepared according to another embodiment of the invention.

FIG. 4A is a sectional view of a double-walled hollow airfoil 200, prepared according to the present invention, for example, according to processes described with reference to FIGS. 1A-E and FIG. 5. Airfoil 200 may be formed from a metal alloy, such as a titanium alloy, or a nickel- or cobalt-based superalloy. Airfoil 200 may include an outer wall 203 and an inner wall 205. Airfoil 200 may further include a plurality of voids 222 therein. Airfoil 200 may further include a plurality of film cooling holes 230, the location of which may be indicated in FIG. 4A by solid arrows. Airfoil 200 may further include at least one impingement hole 232, the location of which may be indicated in FIG. 4A by broken arrows. Impingement holes 232 may provide fluid communication between voids 222, while film cooling holes 230 may provide fluid communication of voids 222 with external surface 203a of airfoil 200.

The size, arrangement, and geometry of voids 222, impingement holes 232, and film cooling holes 230 may be, at least to some extent, a matter of design choice. For example, voids 222 may be interconnected in various ways to provide one or more separate internal cooling circuits (not shown) within airfoil 200. It is to be understood, that the invention is by no means limited to the configuration of voids 222 and film cooling holes 230 shown in FIG. 4A. A hollow airfoil having a plurality of separate internal cooling circuits is disclosed in commonly assigned, co-pending U.S. Published Patent Application No. 20040076519 A1, entitled *High Effectiveness Turbine Vane or Blade*, the disclosure of which is incorporated by reference herein in its entirety.

Figure 4B:
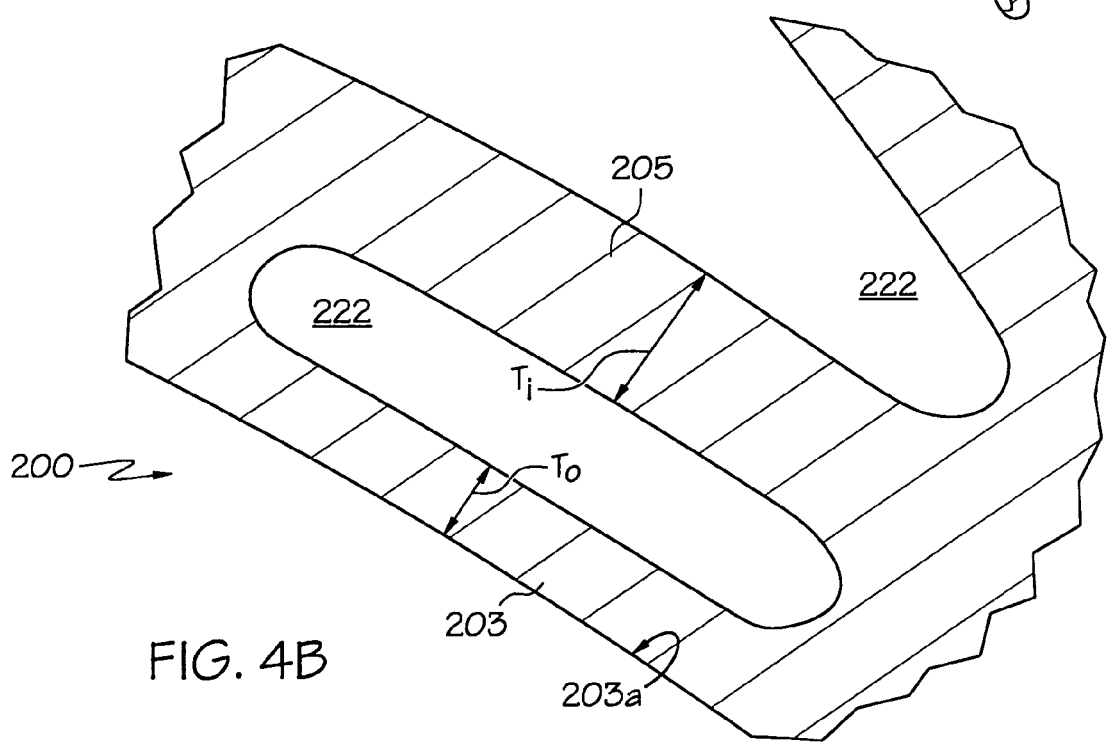
FIG. 4B is an enlarged view showing inner and outer walls of the airfoil of FIG. 4A.

FIG. 4B is an enlarged view showing outer wall 203 and inner wall 205 of airfoil 200 in relation to void 222. The thickness of inner wall 205, $T_1$ and of outer wall 203, $T_O$ may depend on the overall dimensions of airfoil 200, as well as on other design parameters. Because processes of the present invention may eliminate core shifting in secondary mold 30 during casting metal components, tighter tolerance of thickness of component walls, e.g., inner wall 205 and outer wall 203, may be achieved. As a result, the thickness, To of outer wall 203 may be in a range typically as low as 0.015 to 0.008 inches, and often as low as from about 0.012 to 0.008 inches. In comparison, airfoil outer walls prepared by conventional processes of the prior art may have a thickness of about 0.020 inches. Although, FIGS. 4A-B show a double-walled airfoil 200, the present invention may also be used for forming single-walled airfoils, as well as for forming components other than airfoils.

Figure 5:
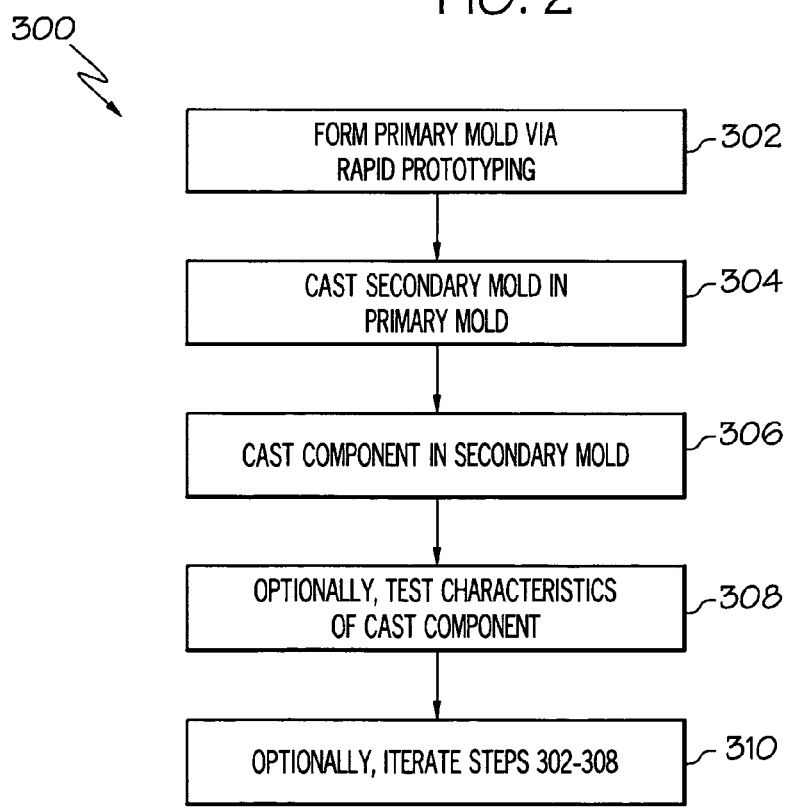
FIG. 5 schematically represents a series of steps involved in a method for forming metal components by a rapid prototyping process, according to another embodiment of the invention.

FIG. 5 schematically represents a series of steps involved in a method 300 for forming metal components, according to another embodiment of the invention, wherein step 302 may involve forming a primary mold via a rapid prototyping process. Step 302 may involve forming the primary mold generally as described hereinabove, e.g., with reference to FIG. 1A. As used herein, the term "rapid prototyping" may be used broadly to encompass both rapid tooling and rapid manufacturing, both of which involve construction of objects by sequential deposition of a plurality of layers of material based on CAD data. As an example, the present invention may be used not only to develop components, such as airfoils, in an iterative process, but also for production manufacturing of such components by CAD-based rapid manufacturing of the primary mold.

Step 304 may involve forming a secondary mold from the primary mold. Step 304 may be performed generally as described hereinabove, for example, with reference to FIGS. 1B-C. In some embodiments, the secondary mold may be formed by a gelcasting process, in which a ceramic slurry is cast into voids of the primary mold. Thereafter, the slurry may be cured to form a green body, and the green body may be sintered to provide the secondary mold.

Step 306 may involve casting a component in the secondary mold. The component may be a metal component. Step 306 may involve filling the secondary mold with metal component material. The metal may be an alloy, such as a titanium alloy, a nickel-based alloy, or a cobalt-based alloy. Step 306 may involve pouring molten metal into the secondary mold. The molten metal may be allowed to solidify, and the secondary mold may be allowed to cool. The metal component may be removed from the secondary mold. In embodiments where the metal component comprises an airfoil (FIGS. 3A-B), such as a turbine blade, the root portion of the blade may be machined after removal of the secondary mold.

The geometry of the metal component to be formed according to method 300 may be a matter of design choice. As an example, the metal component may be hollow, for example, having one or more internal voids therein. The internal voids of the metal component may be in communication with the exterior of the metal component via one or more channels terminating in one or more holes at an external surface of the metal component. In some embodiments, the metal component may be a hollow airfoil (see, e.g., FIGS. 4A-B), such as a turbine blade. A hollow airfoil having a plurality of internal voids forming a plurality of internal cooling circuits is disclosed in commonly assigned, co-pending U.S. Published Patent Application No. 20040076519 A1, entitled *High Effectiveness Turbine Vane or Blade*, the disclosure of which is incorporated by reference herein in its entirety.

Again with reference to FIG. 5, optional step 308 may involve testing the characteristics of the metal component cast in step 306. For example, step 308 may be performed during a series of iterations in the development of a prototype part. As a more specific example, in cases where the metal component may be a turbine blade for a gas turbine engine, the cooling characteristics of one or more cooling channels or circuits of the blade may be tested, and the test results may be analyzed as a basis for re-design of the primary mold, secondary mold, and component. Thus, based on test characteristics provided in step 308, step 310 may involve iterating steps 302-308. Alternatively, in the case of a component that has been developed, e.g., via rapid prototyping, the component may be produced by rapid manufacturing according to steps 302-306, i.e., steps 308 and 310 may be omitted.

It should be understood, of course, that the foregoing relates to exemplary embodiments of the invention and that modifications may be made without departing from the spirit and scope of the invention as set forth in the following claims.

We claim:

1. A method for forming a metal component, comprising:
   a) forming a primary mold by a rapid prototyping process such that the primary mold comprises a primary shell and a primary core that is formed integral with said primary shell;
   b) forming a secondary mold from said primary mold by casting secondary mold material in said primary mold; and
   c) casting said metal component in said secondary mold.

2. The method of claim 1, wherein:
   said secondary mold material comprises a ceramic.

3. The method of claim 1, wherein said primary mold comprises a primary outer void defining a secondary shell of said secondary mold.

4. The method of claim 3, wherein said primary mold further comprises at least one primary inner void defining at least one secondary core of said secondary mold.

5. The method of claim 4, wherein: said metal component includes at least one component internal void, and said at least one secondary core defines said component internal void.

6. The method of claim 2, wherein said primary mold comprises at least one primary registration portion for registering said primary core with said primary shell.

7. The method of claim 4, wherein said secondary mold comprises at least one secondary registration portion for registering said at least one secondary core with said secondary shell.

8. The method of claim 7, wherein said at least one secondary registration portion provides correct spatial alignment of said at least one secondary core with respect to said secondary shell.

9. The method of claim 7, wherein said at least one secondary registration portion eliminates shifting of said at least one secondary core during said step c).

10. The method of claim 1, wherein said metal component includes a component wall having a thickness of from about 0.015 to 0.008 inches.

11. The method of claim 7, wherein: said metal component includes an external surface and at least one component internal void, and said secondary registration portion defines a channel and a hole disposed between said external surface and said component internal void.

12. The method of claim 1, wherein said primary mold is formed by a micro-droplet fabrication rapid prototyping process.

13. The method of claim 1, wherein said primary mold is formed by sequential deposition of a plurality of layers of a primary mold material.

14. The method of claim 13, wherein said sequential deposition is based on Computer-Aided Design data.

15. The method of claim 13, wherein said primary mold material comprises a wax or a thermoplastic.

16. The method of claim 12, wherein said primary mold is formed by sequential deposition of a plurality of layers of a primary mold material and a plurality of layers of a support material.

17. The method of claim 16, wherein said support material comprises a wax or a thermoplastic.

18. The method of claim 16, wherein said step a) comprises removing said support material to form a primary outer void and at least one primary inner void within said primary mold.

19. The method of claim 1, wherein: said secondary mold comprises a secondary shell and a secondary core integral with said secondary shell, and said primary mold is a one-piece mold adapted for simultaneously casting said secondary shell and said secondary core.

20. The method of claim 1, wherein said secondary mold is formed by gelcasting.

21. The method of claim 1, wherein said secondary mold is formed by filling said primary mold with a slurry, wherein said slurry comprises a ceramic powder and an incipient binder.

22. The method of claim 21, wherein said slurry further comprises a polymerization initiator.

23. The method of claim 1, wherein said step b) comprises: d) removing said primary mold; and e) sintering said secondary mold material.

24. The method of claim 1, wherein said step c) comprises a process selected from the group consisting of single crystal casting, directionally solidified casting, and equiaxial casting.

25. The method of claim 1, wherein said metal component comprises an airfoil for a gas turbine engine.

26. The method of claim 1, wherein said metal component comprises a turbine blade.

27. The method of claim 25, wherein said airfoil has a double wall.

28. The method of claim 25, wherein: said airfoil includes a hollow airfoil portion having a plurality of film cooling holes, and said plurality of film cooling holes are formed by said step c).

29. The method of claim 1, wherein said secondary core defines at least one component internal void disposed within said metal component.

30. A method for casting a metal component, comprising:
a) forming a one-piece primary mold via a rapid prototyping process such that said primary mold includes a primary shell and a primary core that is formed integral with said primary shell;
b) forming a secondary mold from said primary mold, wherein said secondary mold includes a secondary shell and a secondary core formed integral with said secondary shell, and said secondary mold comprises a ceramic; and
c) casting said metal component in said secondary mold, wherein said metal component includes at least one component internal void, and said secondary core defines said at least one component internal void.

31. The method of claim 30, wherein said metal component comprises a hollow airfoil.

32. The method of claim 31, wherein said hollow airfoil includes: an external surface, a hole disposed in said external surface, and a channel disposed between said at least one component internal void and said hole.

33. The method of claim 32, wherein said hole comprises a film cooling hole.

34. The method of claim 33, wherein: said secondary mold includes at least one secondary registration portion, and said at least one secondary registration portion defines said film cooling hole.

35. A method for rapid prototyping a hollow metal airfoil, comprising:
a) forming a one-piece primary mold via a rapid prototyping process such that said primary mold includes a primary shell and a primary core that is formed integral with said primary shell;
b) gelcasting a secondary mold from said primary mold, wherein said secondary mold includes a secondary shell, a secondary core formed integral with said secondary shell, and a plurality of secondary registration portions for registering said secondary shell with said secondary core, and wherein said secondary mold comprises a ceramic; and
c) casting said metal airfoil in said secondary mold, wherein said metal airfoil includes an external surface having a plurality of film cooling holes therein, and at least one component internal void in communication with said film cooling holes, wherein said film cooling holes are formed by said step c).

36. The method of claim 35, wherein each of said film cooling holes is defined by a corresponding one of said secondary registration portions of said secondary mold.

37. The method of claim 35, wherein said metal airfoil includes an outer wall having a thickness of from about 0.012 to 0.008 inches.

38. The method of claim 35, wherein said metal airfoil comprises a turbine blade.

39. The method of claim 35, wherein said metal airfoil comprises a double-walled turbine blade.

40. The method of claim 35, further comprising: d) testing characteristics of said metal airfoil; and e) based on results obtained in step d), iterating said steps a) through c).

41. The method of claim 40, comprising: sequentially repeating said steps d) and e).

42. A method for forming a secondary mold, comprising:
a) forming a one-piece primary mold by a rapid prototyping process such that said primary mold has a primary core, a primary shell formed integral with said primary core, and a primary outer void disposed between said primary shell and said primary core; and
b) gelcasting said secondary mold in said primary mold, said secondary mold having a secondary core, a secondary shell formed integral with said secondary core, and at least one secondary registration portion for registering said secondary shell with said secondary core, wherein said primary outer void defines said secondary shell.

43. The method of claim 42, wherein said step a) comprises sequentially depositing a plurality of layers of primary mold material, wherein said sequentially depositing is based on Computer-Aided Design data.

44. The method of claim 42, wherein said primary mold comprises a wax or a thermoplastic.

45. The method of claim 42, wherein said secondary mold comprises a ceramic.

46. The method of claim 42, wherein: said primary core includes at least one primary inner void, and said primary inner void defines said secondary core.

47. An airfoil for a gas turbine engine prepared according to the method of claim 1.

48. The metal component cast according to a process as recited in claim 30.

49. The hollow airfoil prepared according to the method of claim 35.

* * * * *